Dec. 8, 1959   C. A. CHAYNE ET AL   2,916,027
CHARGE FORMING MEANS
Filed Dec. 28, 1956   2 Sheets-Sheet 2

INVENTORS
Charles A. Chayne &
BY John Dolza
L.D. Burch
ATTORNEY

United States Patent Office 2,916,027
Patented Dec. 8, 1959

2,916,027

CHARGE FORMING MEANS

Charles A. Chayne, Bloomfield Township, and John Dolza, Fenton, Mich., assignors to General Motors Corporation, Detroit, Mich., a corporation of Delaware Application December 28, 1956, Serial No. 631,171

15 Claims. (Cl. 123—119)

The present invention relates to charge forming means for internal combustion engines and more particularly to the induction system and intake manifolding therefor.

A multicylinder internal combustion engine of the so-called spark ignited variety employs an intake manifold which supplies the induction air to the cylinders. It has been found that the efficiency and output of such an engine can be increased by employing an intake manifold having ram pipes for charging the cylinders and a fuel injection system for spraying metered fuel into the charge. When employing such an arrangement it is difficult to properly silence the induction noises and filter the air without disrupting the ram effect.

It is proposed to provide an intake manifold for the charge forming means of an internal combustion engine that will insure a high volumetric efficiency and uniform distribution of the charge while still permitting the silencing and filtering of the induction air. This is to be accomplished by providing an intake manifold having a central resonance chamber which is divided into two separate compartments by a filter element. An inlet introduces atmospheric air into one of these compartments and an outlet from the other of these compartments interconnects with the center of a header duct having arms on the opposite ends thereof which extend longitudinally of the engine. Ram pipes extend transversely from each arm to the cylinders on the opposite side of the engine. A throttle valve is provided at the inlet ends of each longitudinal chamber so that the volume of air downstream from the throttle valves will be a minimum. In addition, a shroud may enclose at least a portion of the intake manifold so as to allow cooling air to circulate around the resonance chamber and thereby prevent the transfer of heat from the engine into the manifold and the charge therefor.

Figure 1:
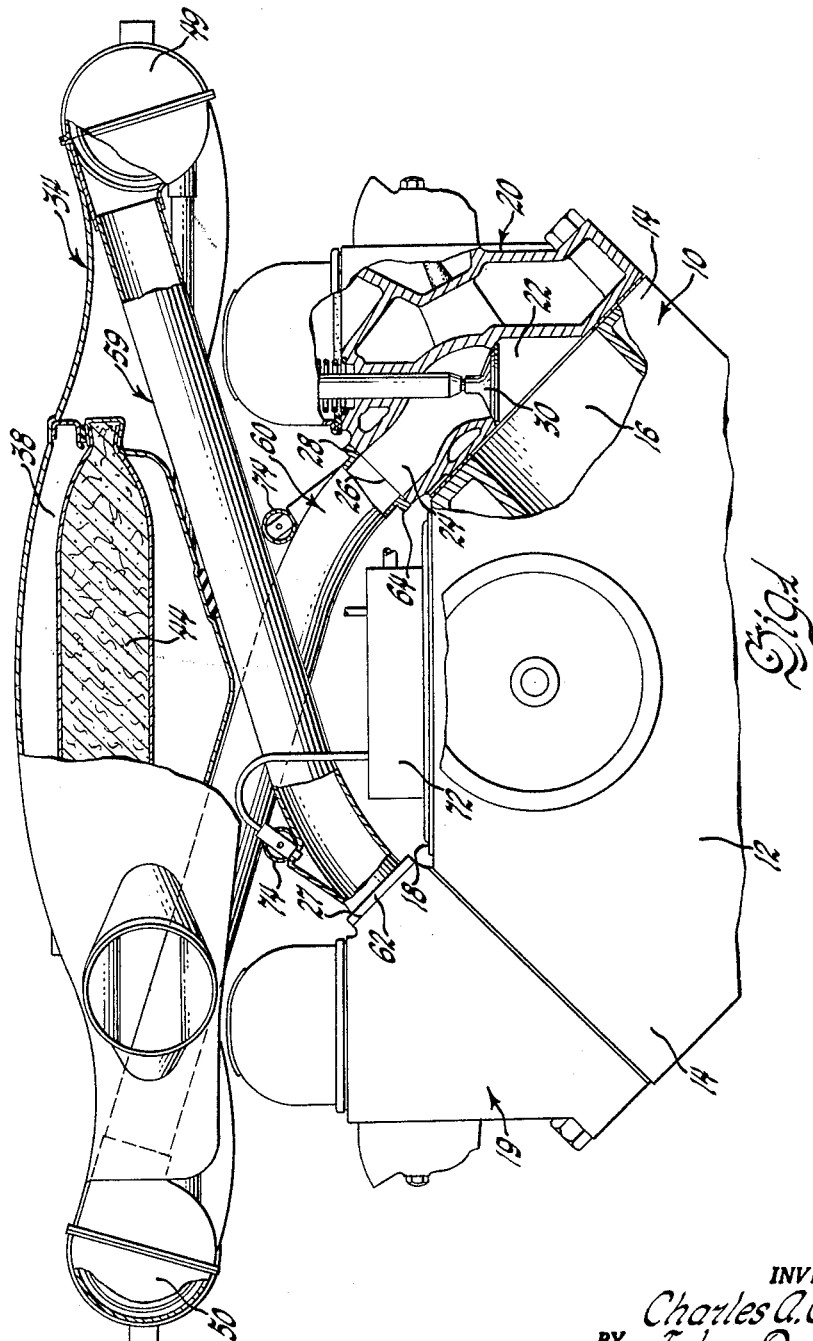
Figure 1 is a fragmentary end view of an engine employing an induction system embodying the present invention.
Figure 2:
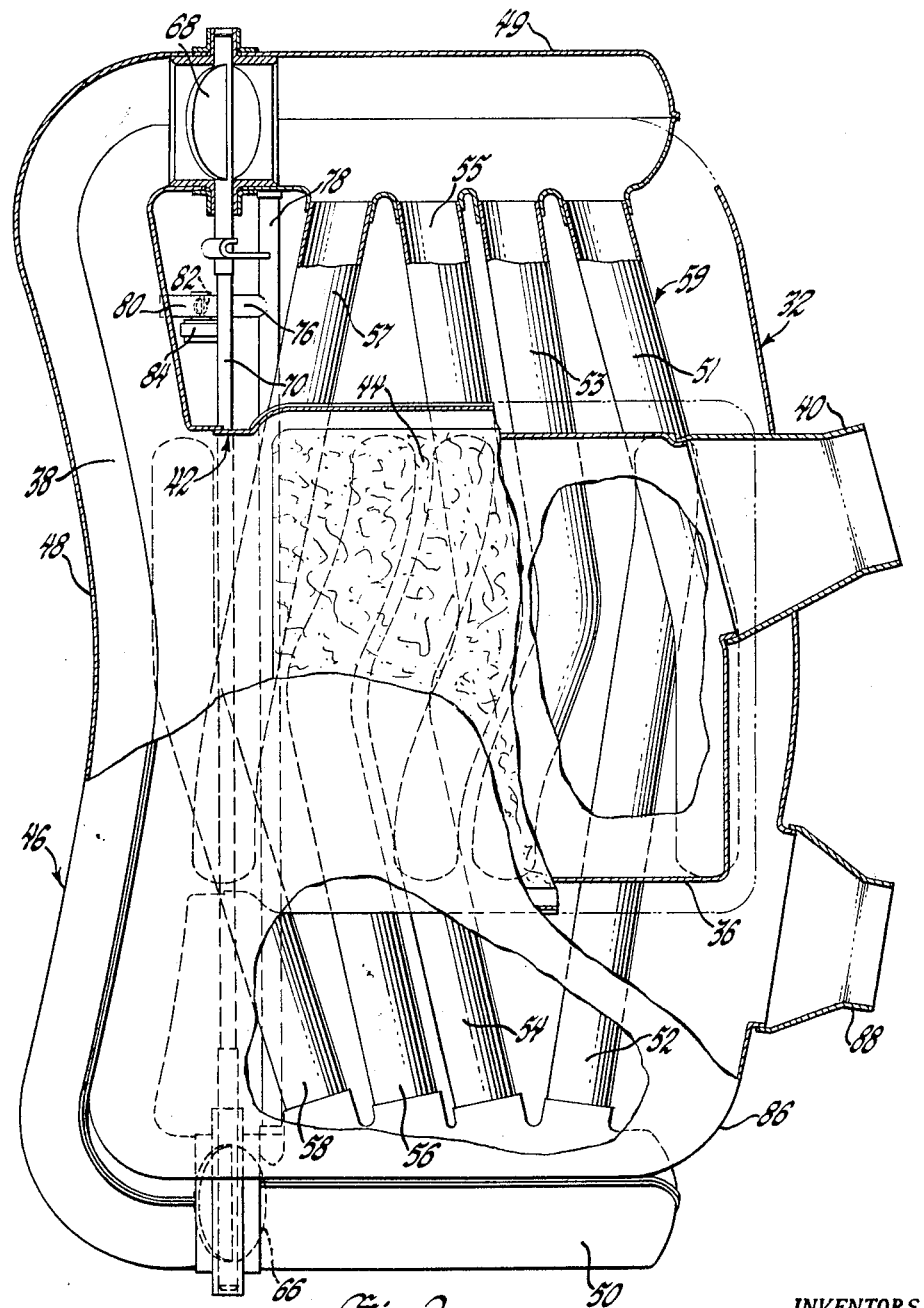
Figure 2 is a plan view, with portions thereof being broken away, of the intake manifold employed in Figure 1.

Referring to the drawings in more detail, the present invention is employed in charge forming means for a multicylinder internal combustion engine 10. Although this engine 10 may be of any suitable design, in the present instance it is of the so-called V-type and includes a cylinder block 12 having a pair of angularly disposed banks 14 of cylinders 16 with an upwardly opening space 18 therebetween. Separate cylinder heads 19 and 20 are secured to each cylinder bank 14 to close the upper ends of the cylinders 16. These heads 19 and 20 include cavities therein positioned to register with the ends of the cylinders to form combustion chambers 22. A separate intake passage 24 for each combustion chamber 22 extends transversely through the cylinder heads 19 and 20 with the inner ends thereof forming intake valve seats 24 and the outer ends thereof forming intake ports 26 in the faces 27 and 28 on the inner sides of the heads 19 and 20. The intake valves 30 which control the admission of the charge into the combustion chambers 22 are actuated by a camshaft.

The air for the combustible charge for the combustion chambers 22 is supplied by an induction system 32 which includes an intake manifold 34 disposed over the upwardly opening space 18 between the two cylinder banks 14.

This manifold 34 includes a sheet metal box 36 that forms an enlarged chamber 38 and has an induction air intake 40. This intake 40 preferably projects forwardly from the box and is positioned to receive an unrestricted supply of cool atmospheric air. The box 36 also includes an outlet 42 in the back thereof so that the air may flow longitudinally through the chamber 38. This chamber 38 may be shaped to form a resonance chamber that is particularly adapted to silence sounds that may originate in the engine and be present in the induction air. In addition, a suitable filter element 44 may be disposed inside of the chamber 38 for the air to flow therethrough. Thus any foreign particles that might damage the working parts of the engine will be removed.

The outlet 42 in the rear of the chamber 38 is interconnected with the center of a header duct 46. This duct 46 includes a center portion 48 disposed transversely of the engine 10 and substantially normal to the outlet 42 and a pair of longitudinal arms 49 and 50 disposed above and parallel to the cylinder banks 14 so as to extend forwardly along the opposite sides of the box 36. Two sets 59 and 60 of ram pipes 51, 52, 53, 54, 55, 56, 57 and 58 are provided that extend diagonally across the engine 10 to interconnect the arms 49 and 50 with the cylinders for supplying air thereto. The upper ends of the ram pipes 51, 53, 55 and 57 in the first group 59 connect with the arm 49 on one side, while the lower ends form openings in a base plate 62 attached to the face 27 on the cylinder head 19 on the opposite side of the engine. The upper ends of the ram pipes 52, 54, 56 and 58 in the other set 60 communicate with the other arm 50 while the lower ends form openings in the other base plate 64. These openings are positioned to register with the intake ports 26 so that induction air may flow from the arms 49 and 50 through the ram pipes 51 to 58 and intake passages 24 into the combustion chambers 22.

It is desirable that all of these ram pipes 51 to 58 be as substantially identical as possible to insure uniformity of charging the cylinders. It has been found that by shaping the ram pipes 51 to 58 as disclosed, the column of air moving through the ram pipe will acquire considerable momentum that will tend to ram the air into the cylinders and thereby increase the volume of charge flowing into the cylinders. In addition, it has been found that the length of the ram pipes 51 to 58 may be tuned to the timing of the intake valves 30 during at least one engine operating condition. When this phenomenon occurs there will be a further increase in the ram effect that will materially add to the charging of the cylinders. The volume of the header duct 46 and particularly the arms 49 and 50 should be large enough so that the resistance to the flow of air therethrough will be very small and also of sufficient size to prevent the flow of air into one ram pipe adversely affecting the flow in another pipe. Thus all of the resonance and ramming will occur in the individual ram pipes 51 to 58.

To regulate the load on the engine 10 the flow of induction air must be throttled. It has been found desirable for the volume of air posterior to the throttle valve to be as small as possible to insure an accurate control being maintained over the engine speed even during idling. Although the volume may be drastically reduced by placing separate throttle valves in each ram pipe, a considerable amount of difficulty is experienced in insuring all of the throttles acting in exact unison so that uniform charging will be maintained. Accordingly, separate throttle valves 66 and 68 may be disposed in the inlet to each arm 49 and 50 and mounted on a common throttle shaft 70 that extends transversely across the manifold. Since both valves 66 and 68 are mounted on a common shaft 70 they will be maintained in unison. It may therefore be seen that even though the volume of the resonance chamber 38 is of adequate size, the volume of air posterior to the throttle valves 66 and 68, i.e., the arms 49 and 50 and ram pipes 51 to 58, is of minimum size.

In order to form a combustible charge of air and fuel, a fuel injection system 72 is provided such as that disclosed in copending applications Serial No. 511,954, Fuel Injection System filed May 31, 1955 in the name of John Dolza and Serial No. 591,889, Fuel Injection System filed June 18, 1956 in the name of John Dolza. The system is responsive to the amount of air flowing into the engine and is adapted to inject metered fuel into the air by means of separated nozzles 74 located at the ends of the ram pipes 51 to 58 and aimed at intake valves 30.

When an internal combustion engine is operating at subnormal temperatures it is desirable for the idling speed to be increased slightly above the normal amount. Accordingly, a fast idle vent 76 is provided to increase the idle air flow. This vent includes a balance tube 78 that extends transversely of the manifold to interconnect the two arms 49 and 50 with each other posterior to the throttle valves 66 and 68. An inlet 80 projects rearwardly from this tube 78 and includes an idling throttle valve 82 therein. The position of idle throttle valve 82 is regulated by a thermostat 84 responsive to the temperature of the engine 10. During normal operation of the engine the thermostat 84 will retain the idle valve 82 closed so that the throttle valves 66 and 68 will retain complete control over the air flow. However, during subnormal temperatures the thermostat 84 will open the idle valve 82. Thus the balance tube 78, in addition to insuring identical conditions in each arm 49 and 50, also allows a limited amount of idle air to bleed around the throttle valves 66 and 68 and increase the idle speed when the engine temperature is below normal.

It has also been found desirable to provide a sheet metal shroud 86 around at least a portion of the manifold. This shroud 86 includes an atmospheric inlet 88 that allows cool air to enter and circulate around the various parts of the manifold. This air will thus form an insulating envelope that will be effective to substantially eliminate the transfer of heat from the engine to the manifold. As a result this will prevent heating of the charge and further improve the volumetric efficiency of the induction system.

It may thus be seen that an induction system has been provided that includes an intake manifold having an inlet thereto that includes both a filter and a silencer and which is especially adapted to provide a substantially unobstructed path for the induction air to flow to the cylinders. In addition, the volumetric efficiency is further increased both as a result of the ramming action created in the ram pipes and also the cooling of the various parts of the intake manifold. However, the throttle valves are arranged so that there is a minimum volume of air posterior thereto and thus an accurate control is maintained over the engine performance at all times.

It is to be understood that, although the invention has been described with specific reference to a particular embodiment thereof, it is not to be so limited since changes and alterations therein may be made which are within the full intended scope of this invention as defined by the appended claims.

We claim:

1. An induction system for an internal combustion engine having a plurality of cylinders comprising intake manifold means having a plenum chamber with a throttle valve inlet and a plurality of substantially identical ram pipes interconnecting the plenum chamber with said cylinders for supplying a charge thereto, fuel means adapted to inject fuel into said charge to form a combustible mixture, a shroud enclosing at least a portion of said means for circulating air therearound.

2. An induction system for an internal combustion engine having a plurality of cylinders comprising intake manifold means having at least one plenum chamber with an inlet for supplying throttled air thereto and ram pipes for interconnecting said plenum chamber with said cylinders for supplying a charge thereto, fuel means responsive to said air flow for injecting metered quantities of fuel into the charge to form a combustible mixture of air and fuel, and a shroud enclosing at least a portion of said means for circulating cooling air therearound.

3. An induction system for an internal combustion engine having a pair of angularly disposed banks of cylinders, said induction system comprising intake manifold means having a plenum chamber containing throttled air therein and ram pipes interconnecting said plenum chamber with said cylinders, fuel means adapted to inject metered quantities of fuel into the charges in said ram pipes, and a shroud enclosing at least a portion of said means for circulating air therearound.

4. An induction system for an internal combustion engine having a pair of angularly disposed banks of cylinders, said induction system comprising intake manifold means having at least one plenum chamber with an inlet for supplying throttled air thereto and ram pipes for interconnecting said plenum chamber with said cylinders for supplying a charge thereto, fuel means adapted to inject metered quantities of fuel into the charge in said ram pipes, a shroud enclosing at least a portion of said means and having an inlet communicating with the atmosphere for circulating cooling air therearound.

5. An induction system for an internal combustion engine having a pair of angularly disposed banks of cylinders, said induction system comprising intake manifold means having at least one plenum chamber with an inlet for supplying throttled air thereto and two sets of ram pipes adapted to be interconnected with the cylinders in the two banks for supplying the throttled air in said chamber to said cylinder, fuel means responsive to said air flow for injecting metered quantities of fuel into the charge in said ram pipes to form a combustible mixture of air and fuel, and a shroud enclosing at least a portion of said means and having an inlet communicating with the atmosphere for circulating cooling air around at least said portion.

6. In an internal combustion engine having a pair of angularly disposed banks of cylinders with an upwardly open space therebetween, an induction system comprising intake manifold means and fuel means, said intake manifold means including a pair of elongated plenum chambers disposed on the opposite sides of said engine and extending substantially parallel to said banks of cylinders, two sets of ram pipes with the pipes in each set interconnecting a plenum chamber with the cylinders in the bank most remote therefrom, inlets to said plenum chambers and having throttle valves therein for regulating the amount of air supplied thereto, said fuel means being responsive to said air flow and adapted to inject metered quantities of fuel into the charge in said ram pipes, and a shroud encompassing at least a portion of said means and having an inlet communicating with the atmosphere to allow cooling air to circulate therearound.

7. In an internal combustion engine having a pair of angularly disposed banks of cylinders with an upwardly open space therebetween, an induction system comprising intake manifold means and fuel means, said intake manifold means including a pair of elongated plenum chambers disposed on the opposite sides of said engine and extending substantially parallel to said banks of cylinders, two sets of ram pipes with the pipes in each set interconnecting a plenum chamber with the cylinders in the bank most remote therefrom, each of said plenum chambers having an inlet for supplying air thereto, duct means interconnecting said inlets together and having at least one throttle valve therein for regulating the air flow, said fuel means being responsive to said air flow and adapted to inject metered quantities of fuel into the charge in said ram pipes, and a shroud enclosing at least a portion of said means and having an inlet communicating with the atmosphere to allow cooling air to circulate therearound.

8. In an internal combustion engine having a pair of angularly disposed banks of cylinders with an upwardly open space therebetween, an induction system comprising intake manifold means and fuel means, said intake manifold means including a pair of elongated plenum chambers disposed on the opposite sides of said engine and extending substantially parallel to said banks of cylinders, two sets of ram pipes with the pipes in each set interconnecting a plenum chamber with the cylinders in the bank most remote therefrom, inlets to each of said plenum chambers, each of said inlets including a throttle valve for regulating the amount of air supplied thereto, duct means interconnecting said inlets with each other and communicating with the atmosphere for supplying air thereto, said fuel means being responsive to said air flow and adapted to inject metered quantities of fuel into the charge in said ram pipes, and a shroud enclosing at least a portion of said means and having an inlet communicating with the atmosphere to allow cooling air to circulate therearound.

9. In an internal combustion engine having a pair of angularly disposed banks of cylinders with an upwardly open space therebetween, an induction system comprising intake manifold means and fuel means, said intake manifold means including a pair of elongated plenum chambers disposed on the opposite sides of said engine and extending substantially parallel to said banks of cylinders, two sets of ram pipes with the pipes in each set interconnecting a plenum chamber with the cylinders in the bank most remote therefrom, each of said plenum chambers having an inlet for supplying air thereto, duct means interconnecting said inlets together and having at least one throttle valve therein for regulating the air flow, said fuel means being responsive to said air flow and adapted to inject metered quantities of fuel into the charge in said ram pipes, a shroud enclosing at least a portion of said means and having an inlet communicating with the atmosphere to allow cooling air to circulate therearound, and air cleaning means disposed in said duct means anterior to said throttle valve.

10. An intake manifold for an internal combustion engine having a pair of angularly disposed banks of cylinders, said manifold comprising a pair of plenum chambers adapted to be disposed on the opposite sides of said engine, ram pipes adapted to extend transversely of said engine for interconnecting said plenum chambers with said cylinders, inlets to said chambers for supplying air thereto, duct means communicating with the atmosphere and interconnecting said inlets with each other for supplying air thereto, and throttle means for controlling said supply.

11. An intake manifold for an internal combustion engine having a pair of angularly disposed cylinder banks, said manifold comprising a pair of plenum chambers adapted to be disposed on the opposite sides of said engine adjacent said cylinder banks, a separate set of ram pipes for each of said chambers, each of said sets of ram pipes being adapted to interconnect said plenum chambers with a group of said cylinders, a separate inlet for each of said plenum chambers for supplying throttled amounts of induction air thereto, duct means interconnecting said inlets and communicating with the atmosphere for drawing air therefrom.

12. An intake manifold for an internal combustion engine having a pair of angularly disposed cylinder banks, said manifold comprising a pair of plenum chambers adapted to be disposed on the opposite sides of said engine adjacent said cylinder banks, a first set of ram pipes for one of said plenum chambers for interconnecting said chamber with one group of cylinders, a second set of ram pipes for the other of said plenum chambers for interconnecting that chamber with another group of cylinders, a separate inlet to each of said chambers, a separate throttle valve in each of said inlets for regulating the amount of air flow, duct means interconnecting said inlets and communicating with the atmosphere for supplying filtered air thereto.

13. In an internal combustion engine having a pair of angularly disposed banks of cylinders with an upwardly opening space therebetween, an intake manifold comprising a pair of elongated plenum chambers disposed on the opposite sides of said engine and extending longitudinally thereof substantially parallel to said banks, a separate set of ram pipes for each of said chambers for interconnecting the chamber on one side with the cylinders in the bank on the opposite side, a separate inlet into each of said chambers for supplying air thereto in an axial direction, a throttle valve in each of said inlets for regulating the air flow therethrough, a duct extending transversely of said engine to communicate with the atmosphere and to interconnect said inlets with each other for supplying air thereto.

14. In an induction system for an internal combustion engine having a pair of angularly disposed banks of cylinders, an intake manifold having plenum chamber means, inlet means interconnecting said plenum chamber means with the atmosphere and having a throttle valve therein for regulating the flow of air therethrough, a first set of substantially identical ram pipes having the upper ends thereof forming a first row of openings into said plenum chamber means along one side thereof, said ram pipes having the lower ends thereof interconnected with the cylinders on an opposite side of said engine, a second set of substantially identical ram pipes having the upper ends thereof forming a second row of openings into said plenum chamber means along said second side, the lower ends of said second set of ram pipes communicating with the cylinders on said first side of said engine.

15. Charge forming means for an internal combustion engine having a pair of angularly disposed banks of cylinders, said charge forming means comprising an intake manifold having plenum chamber means with a throttled inlet and a first set and a second set of substantially identical ram pipes, the ram pipes in each of said sets having the upper ends thereof forming a row of openings into said plenum chamber means along a side thereof parallel to one of said banks and the lower ends thereof communicating with the cylinders in the other of said banks, fuel metering means responsive to the air flow into said engine and effective to meter the fuel in proportion thereto, injector nozzles interconnected with said metering means and communicating with said ram pipes for injecting said metered fuel into the charge flowing therethrough.

References Cited in the file of this patent
UNITED STATES PATENTS
2,127,079    Barkeij _____ Aug. 16, 1938

Disclaimer 2,916,027.—*Charles A. Chayne*, Bloomfield Township, and *John Dolza*, Fenton, Mich. CHARGE FORMING MEANS. Patent dated Dec. 8, 1959. Disclaimer filed July 17, 1963, by the assignee, *General Motors Corporation*.

Hereby enters this disclaimer to claims 10, 11, 14 and 15 of said patent.

[*Official Gazette October 8, 1963.*]